Patented Jan. 12, 1954

2,665,813

UNITED STATES PATENT OFFICE 2,665,813

HIGH FLOW RATE MINERAL FILTER AID

Armand R. Bollaert, Arcadia, and Ernest L. Neu, Hermosa Beach, Calif., assignors to Great Lakes Carbon Corporation, Chicago, Ill., a corporation of Delaware No Drawing. Application May 9, 1949, Serial No. 92,243

5 Claims. (Cl. 210—203)

This invention relates to mineral filter aids of the type adapted to be dispersed in a liquid which is to be clarified and thereafter removed by filtration, and specifically to filter aids produced by vesiculating, comminuting and classifying a perlitic mineral.

The minerals now commonly classified as perlitic are rhyolitic volcanic glasses containing water of hydration. When heated under suitable conditions to a temperature at which the mineral softens, the water of hydration is released and the mineral vesiculates and expands to several times its original volume.

As this operation is ordinarily (though not necessarily) conducted in an internally fired kiln, with the previously comminuted mineral in suspension in a high velocity current of fire gases, the product is typically a mixture of lumps, granules and powder. Such particles as are of appreciable size consist of numerous extremely minute sealed vesicles while the finest particles consist of fragments of vesicle wall material and are not sealed.

The vesicular particles are characteristically lighter than water and ordinarily have a rounded or even approximately spherical contour. A layer of these particles has no clarifying power for other than the coarsest suspensoids and is valueless as a filter aid. We have discovered, however, that when the vesicular particles are blended in suitable proportions with the fragmental particles, the mixture is a highly effective filter aid, particularly adapted to use in situations in which a high flow rate is more important than crystal clarity of filtrate.

In practice a specification for a satisfactory product may be based on limitations to the proportions of the coarsest and the finest particles. We have found that the whole product of an expanding and vesiculating kiln has its component particles quite evenly graduated in size, and in such manner as to yield an evenly graduated product when portions of the largest and of the smallest particles are removed, as by screening or air classifying. For this reason a product having the following specification

| | |
|---|---|
| Retained on #50 U. S. series screen | Not less than 10% nor more than 35%. |
| Passing a #325 U. S. series screen | Not less than 10% nor more than 25%. | by weight as determined by wet screening will give a desirable balance between flow rate and clarifying value.

A more detailed specification, which ensures the highest flow rate consistent with that reasonable approach to complete clarity which this product is intended to produce, is the following:

| | Percent |
|---|---|
| Retained on #30 screen (+590 microns) | Not over 10 |
| Through #30 on #50 (590–297 microns) | 10–25 |
| Through #50 on #100 (297–149 microns) | 20–40 |
| Through #100 on #150 (149–96 microns) | 5–15 |
| Through #150 on #325 (96–44 microns) | 20–35 |
| Through #325 screen (—44 microns) | 10–25 |

As a generality, the larger particles in such a mixture are almost entirely vesicular while the smallest are almost entirely fragmental. It follows that the particle size range of the product is highly important as it determines, on the one hand, the freeness of filtration, particularly of viscous liquids, and on the other the extent to which any given liquid is clarified by the addition of the filter aid and its subsequent removal by filtration. If the proportion of large particles be too great the suspensoids will not be removed, the filtrate will not clear up during the early stages of the filtration and the flow rate will fall off rapidly as the suspensoids pass through the filter cake and blind off the cloth. Per contra, if the proportion of very fine particles be too great, the flow rate will be unduly low because of the impermeability of the cake itself.

Such mixtures always consist of broken and unbroken vesicles, the proportion of particles lighter than water ordinarily ranging from 50 per cent to 75 per cent by weight, and the loose weight of the mixture will ordinarily range between 3 pounds and 4.5 pounds per cubic foot.

The filter aids above described are poorly adapted to use in packs or beds, after the manner of sand filters, and are not recommended for that use. They should be brought into suspension in the liquor to be clarified, by dispersion in a batch of the liquor or by feeding continuously into a flowing liquid stream, and the liquid then passed into a filter press of preferred form. If the accumulated cake shows a tendency to stick to the filter cloth, it is desirable to precoat the cloth with a thin layer of a diatomaceous earth filter aid or to cover the cloth with a layer of permeable paper as described in the copending application of Gordon G. Halvorsen, Serial No. 82,289.

EXAMPLE 1

A perlitic filter aid corresponding in particle size range with the second specification above was used for the filtration of an aqueous solution of a vegetable gum containing very finely divided cellulosic fibre in suspension. The viscosity of the liquor was about 45 centipoises, presenting a rather difficult problem in filtration other than in the respect that crystal clarity of filtrate was not required.

The liquor was filtered in batches of 7,000 gallons through a plate and frame press having a cloth area of 925 square feet. The cloths were precoated with a diatomaceous earth filter aid at the rate of 0.1 pound per square foot. The perlitic filter aid was suspended in the liquor before it was pumped to the press, in various proportions ranging from 0.02 pound to 0.05 pound per gallon and the time required to pass the batch of 7,000 gallons through the press was noted.

The results of these test runs are shown in the table below, in which they are compared with the results obtained in the use of the quality and quantity of diatomaceous earth filter aid shown by experience to give the best results in this particular situation.

Table 1

| Filter aid used | Quantity, pounds per gal. | Filtration time, hours | Dosage ratio | | Flow rate, gals. per sq. ft. hr. |
|---|---|---|---|---|---|
| | | | D. E. | Perlite | |
| Perlitic | 0.0196 | 4.35 | 1.00 | 0.55 | 1.74 |
| Do | .0286 | 2.83 | 1.00 | 0.80 | 2.76 |
| Do | .0357 | 1.80 | 1.00 | 1.00 | 4.20 |
| Do | .0429 | 0.75 | 1.00 | 1.20 | 10.08 |
| Do | ¹.0429 | 0.69 | 1.00 | 1.20 | 11.30 |
| Do | .0500 | 0.83 | 1.00 | 1.41 | 9.12 |
| Diatomaceous earth | .0357 | 2.98 | 1.00 | | 2.54 |

¹ From another batch of filter aid of the same type.

These figures show approximately equal flow rates for diatomaceous earth and perlitic filter aid when the quantity of the latter added is about four-fifths that required in the use of diatomaceous earth. With equal dosages of the two agents the perlitic filter aid is much faster, the time required for the filtration of a batch being about three-fifths that required in the use of diatomaceous earth. On the other hand, the filtrate from the perlitic filter aid was appreciably less clear than that from diatomaceous earth, this clarity being quite sufficient for the particular purpose but lower than would be required in many filtrations.

EXAMPLE 2

A perlitic filter aid corresponding in particle size range with the first specification given above was used for the filtration of a pectin pulp from citrus fruit, the suspensoids being particles and shreds of albedo which are filtered out with difficulty. The runs were of batches of 2,000 gallons each in a press having an available area of about 250 square feet, the cloths being lightly precoated with diatomaceous earth filter aid. The results produced in adding various proportions of the perlitic filter aid are compared with those produced in the use of the optimum quality and quantity of a diatomaceous earth filter aid in the table below:

Table 2

| Filter aid used | Quantity, pounds per gal. | Filtration time, hours | Dosage ratio | | Flow rate, gals per sq. ft. hr. |
|---|---|---|---|---|---|
| | | | D. E. | Perlite | |
| Perlitic | 0.060 | 1.23 | 1.00 | 0.40 | 5.6 |
| Do | .074 | 0.90 | 1.00 | 0.50 | 8.6 |
| Do | .080 | 0.97 | 1.00 | 0.53 | 7.0 |
| Diatomaceous earth | .150 | 1.10 | 1.00 | | 6.2 |

EXAMPLE 3

A perlitic filter aid corresponding in particle size range with the first specification above given was used as an aid to the expression of juice from a pulp produced by crushing prunes. In this practice the filter aid is mixed with the wet pulp, which is then placed in bags and pressed to form a damp cake which is afterward ground for use as cattle feed.

In previous operation using a diatomaceous earth filter aid it had been found necessary to use 4.0% by weight of the type and quality of diatomaceous earth filter aid shown by experience to be the best suited to this use. In the operation of this example the quantity of perlitic filter aid used was 0.8% of the weight of the pulp, or one-fifth the quantity previously used.

The results produced in the use of this smaller quantity of the new filter aid were substantially identical with those previously obtained, in respect to rapidity of expression at equal pressure, relative clarity of the juice and avoidance of sticking of the pressed pulp to the bags. An advantage other than the saving of material was found in the smaller quantity of mineral matter present in the pressed cake.

While the product above described is unsuited to use in filtrations in which complete clarification is required, and particularly to the filtration of liquids containing colloidal or mucilaginous suspensoids, it will be found highly useful in the filtration at high speeds of liquors not requiring absolute clarification, as for example solutions of pectins, gums, algins and the like in which the greater part of the suspensoids are solids.

We claim as our invention:

1. A filter aid composed of broken and unbroken particles of vesiculated perlitic mineral of which not less than 10 per cent nor more than 35 per cent by weight are unbroken particles and retained on a #50 U. S. series screen and not less than 10 per cent nor more than 25 per cent are broken particles which will pass a #325 U. S. series screen, the intermediate fraction of said filter aid consisting of particles of substantially evenly graduated sizes.

2. A filter aid composed of particles of a vesiculated perlitic mineral, not less than 10 per cent nor more than 35 per cent of said particles being larger than 297 microns and consisting of unbroken vesicles and not less than 10 per cent nor more than 25 per cent by weight of said particles being smaller than 44 microns and consisting of broken vesicle wall fragments, the remainder of said filter aid consisting of particles progressively increasing in size from 44 microns to 297 microns.

3. A filter aid composed of particles of a vesiculated perlitic mineral, a portion of said particles being unbroken vesicles and a portion being fragments of vesicle wall, not less than 10 per cent nor more than 35 per cent of the filter aid consisting of unbroken particles larger than 297 microns, not less than 10 per cent nor more than 25 per cent of the filter aid consisting of broken particles smaller than 44 microns, and the remainder of said particles of graduated size progressively increasing from 44 microns to 297 microns, said percentages being by weight as determined by wet screening.

4. A filter aid composed of broken and unbroken particles of a vesiculated perlitic mineral, between about 50 and about 75 per cent of said particles consisting of unbroken vesicles, said filter aid having the following screen analysis in per cents by weight as determined by wet screening on U. S. series screens:

|  | Per cent |
|---|---|
| Retained on #30 screen | Not over 10 |
| Passing #30 and retained on #50 screen | 10–25 |
| Passing #50 and retained on #100 screen | 20–40 |
| Passing #100 and retained on #150 screen | 5–15 |
| Passing #150 and retained on #325 screen | 20–35 |
| Passing #325 screen | 10–25 |

5. A filter aid composed of broken and unbroken particles of a vesiculated perlitic mineral, the size ranges of said particles being: larger than 590 microns, not over 10%; 590 to 297 microns, 10% to 25%; 297 to 149 microns, 20% to 40%; 149 to 96 microns, 5% to 15%; 96 to 44 microns, 20% to 35%; smaller than 44 microns, 10% to 25%; said percentages being by weight of said filter aid.

ARMAND R. BOLLAERT.
ERNEST L. NEU.

References Cited in the file of this patent

UNITED STATES PATENTS

| Number | Name | Date |
|---|---|---|
| Re. 19,166 | Thatcher | May 15, 1934 |
| 2,501,698 | Stecker | Mar. 28, 1950 |

OTHER REFERENCES

California Journal of Mines and Geology, July 1948, pages 293–319.

Chemical and Metallurgical Engineering, July 1945, pages 140 and 142.

Ind. Eng. Chem., vol. 33, pages 1233–7, 1941.